(12) United States Patent
Priest

(10) Patent No.: US 9,204,628 B2
(45) Date of Patent: Dec. 8, 2015

(54) TREE STAND

(75) Inventor: John Brian Priest, Dubuque, IA (US)

(73) Assignee: DDI, Inc., Dubuque, IA (US)

( * ) Notice: Subject to any disclaimer, the term of this patent is extended or adjusted under 35 U.S.C. 154(b) by 1320 days.

(21) Appl. No.: 12/630,843

(22) Filed: Dec. 4, 2009

(65) Prior Publication Data

US 2011/0132686 A1  Jun. 9, 2011

(51) Int. Cl.
  *A01M 31/00* (2006.01)
  *A01M 31/02* (2006.01)
(52) U.S. Cl.
  CPC .................. *A01M 31/02* (2013.01)
(58) Field of Classification Search
  CPC ....................................... A01M 31/02
  USPC .......................... 182/187, 188, 100
  See application file for complete search history.

(56) References Cited

U.S. PATENT DOCUMENTS

| | | | | |
|---|---|---|---|---|
| 2,855,980 | A * | 10/1958 | Konieczka | 248/230.8 |
| 4,721,183 | A * | 1/1988 | Koniecka | 182/187 |
| 4,727,961 | A * | 3/1988 | Dawson | 182/187 |
| 5,060,756 | A | 10/1991 | D'Acquisto | |
| 5,080,193 | A * | 1/1992 | Woof | 182/116 |
| 5,143,177 | A * | 9/1992 | Smith | 182/187 |
| 5,518,083 | A * | 5/1996 | Blennert | 182/188 |
| 6,394,473 | B1 * | 5/2002 | Platner | 280/124.1 |
| 6,547,035 | B1 | 4/2003 | D'Acquisto | |
| 6,568,505 | B1 | 5/2003 | D'Acquisto | |
| 7,086,433 | B1 * | 8/2006 | Serman | 144/34.1 |
| 7,246,683 | B2 * | 7/2007 | Pringnitz | 182/187 |
| 2007/0151803 | A1 * | 7/2007 | D'Acquisto | 182/187 |
| 2008/0236948 | A1 * | 10/2008 | duCellier | 182/187 |

* cited by examiner

*Primary Examiner* — Alvin Chin-Shue
(74) *Attorney, Agent, or Firm* — Rathe Lindenbaum LLP

(57) ABSTRACT

A tree stand includes a tree stand post. In one embodiment, the tree stand post has a non-tubular cross-sectional shape. In one embodiment, a tree claw and cinch line posts are integral with the post as a single unitary body. In one embodiment, the post has a plurality of longitudinally extending oblique curved portions.

11 Claims, 4 Drawing Sheets

TREE STAND

BACKGROUND

Tree stands are used to elevate a person above the ground on a tree to facilitate hunting or wildlife observation.

DETAILED DESCRIPTION OF THE EXAMPLE EMBODIMENTS

Figure 1:
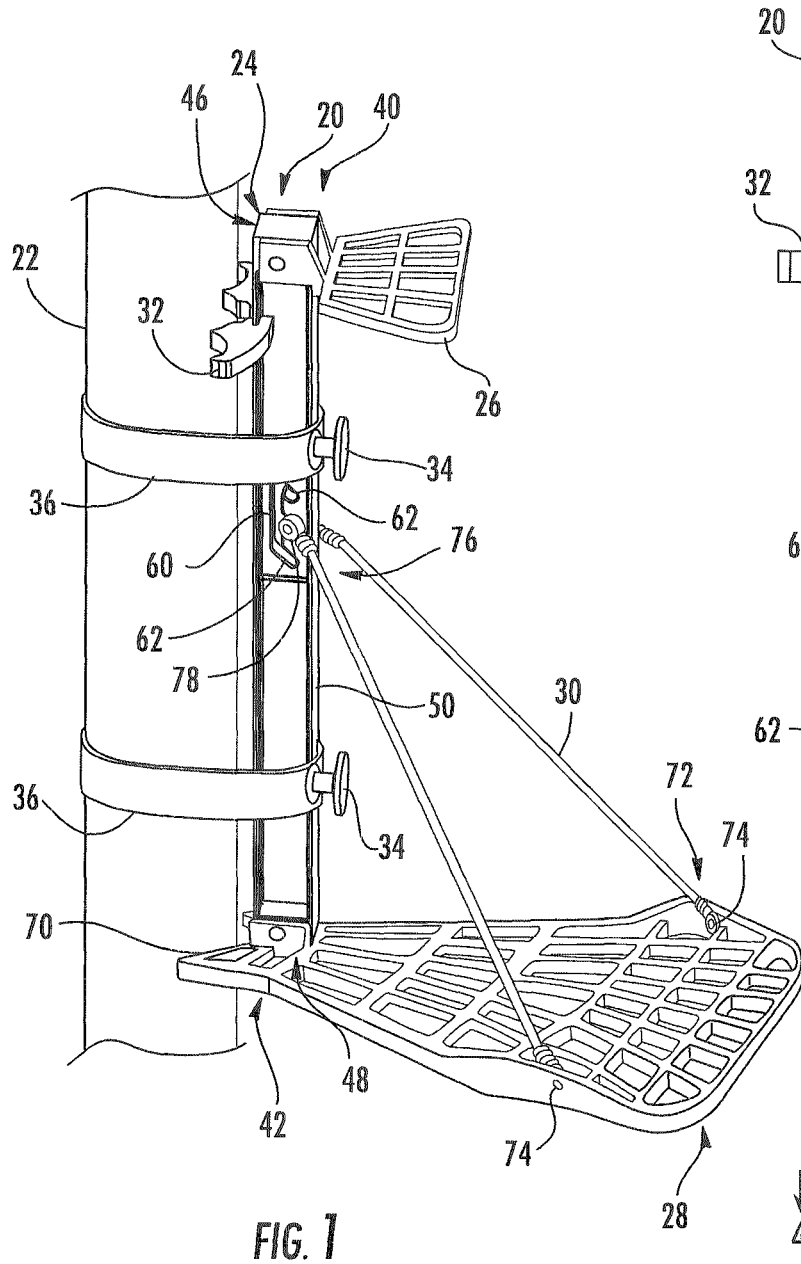
FIG. 1 is a perspective view of a tree stand mounted to a tree according to an example embodiment.

FIG. 1 is a perspective view of an example tree stand 20 mounted to a tree trunk 22. Tree stand 20 mounted to the tree and provides one or more platforms upon which a person hunting or observing wildlife may stand or be seated. As will be described hereafter, tree stand 20 supports the person with reduced noise, allowing a person to be more inconspicuous and enhancing such hunting or wildlife observation. Tree stand 20 includes tree stand post 24, seat platform 26, foot platform 28, platform support line 30, tree claw 32, cinch lines 34 and tree straps 36.

Tree stand post 24 serves as a backbone, spine or rigid support member configured to extend along tree trunk 22 in a vertical direction. Post 24 supports one or more platforms and secures the one more platforms to tree trunk 22. In the example illustrated, post 24 supports and secures two platforms, seat platform 22 and foot platform 28, to one another and to tree trunk 22. In other embodiments, tree stand post 24 may secure and mount a greater or fewer of such platforms. For example, in other embodiments, seat platform 26 may be omitted.

As shown by FIGS. 1-4, tree stand post 24 longitudinally extends from an upper end 40 to a lower end 42. Proximate to end 40, post 24 includes a seat post mounting portion 46 configured to mount or be connected to seat platform 26. In the example illustrated, mounting portion 46 includes a bore such that seat platform 26 may be pinned to post 24. In other embodiments, mounting portion 46 may have other configurations facilitating removable connection of seat platform 26 to posts 24. In yet other embodiments, seat platform 26 may be integrally formed as a single unitary body with post 24.

Proximate to end 42, post 24 includes a foot platform mounting portion 46 configured to mount or be connected to foot platform 28. In the example illustrated, mounting portion 48 includes a bore such that foot platform 28 may be bolted or otherwise secured to post 24. In other embodiments, mounting portion 48 may have other configurations facilitating removable connection of foot platform 28 to posts 24. In yet other embodiments, seat platform 26 may be integrally formed as a single unitary body with post 24.

Figures 3, 4:
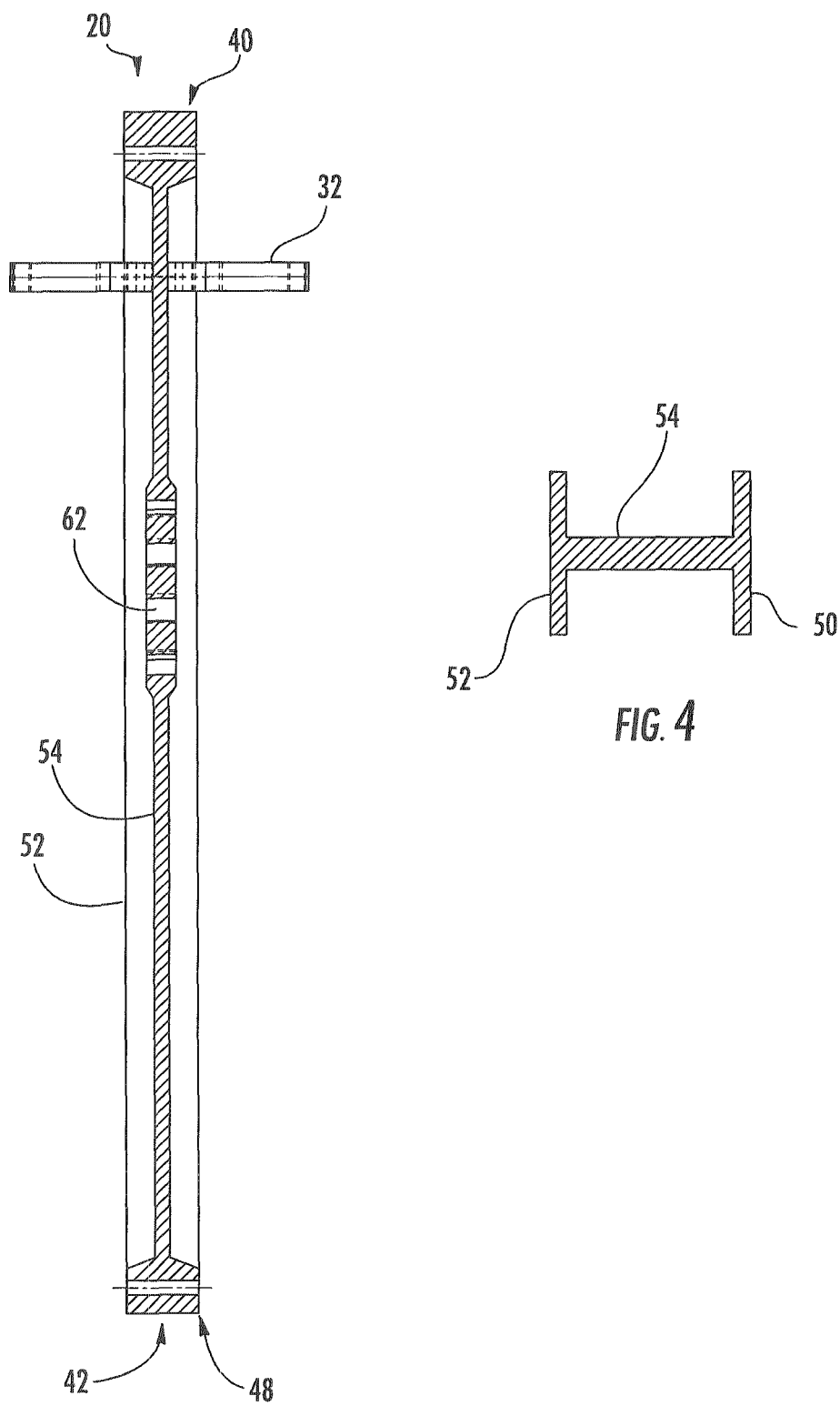
FIG. 3 is a sectional view of the portions of the tree stand of FIG. 2 taken along line 3-3.
FIG. 4 is a sectional view of portions of the tree stand of FIG. 2 take along line 4-4.

As shown by FIGS. 3 and 4, post 24 has a non-tubular cross-section longitudinally extending between ends 40 and 42. Post 24 omits longitudinal internal cavities or chambers. Post 24 omits body portions that are hollow. Because post 24 has a non-tubular cross-section, post 24 omits chambers which would otherwise act as a sound chambers amplifying noise generated by interaction between distinct parts of tree stand 20, generated by interaction between tree stand 20 and tree trunk 22 and generated by interaction between tree stand 20 and the person supported by tree stand 20. Reducing noise allows the person supported by tree stand 22 more inconspicuous when hunting or observing wildlife.

As shown by FIGS. 1 and 4, in the example illustrated, post 24 has an "I" cross sectional shape extending between ends 40 and 42. Post 24 has a front plate portion 50, a rear plate portion 52 and an intermediate plate portion 54. Front plate portion 50 and rear plate portion 52 extend substantially parallel to one another. Intermediate plate portion 54 interconnects plate portion 50 and 52. Intermediate plate portion extends substantially perpendicular to plate portions 50 and 52. Rear plate portion 52 provides surfaces for supporting tree claw 34. Front plate portion 52 provides surfaces for supporting tree strap posts 34.

Figure 2:
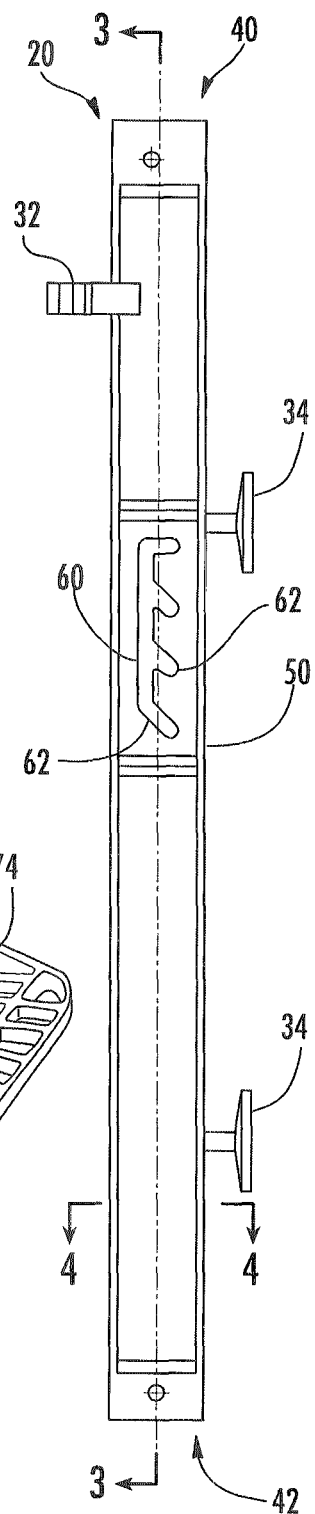
FIG. 2 is a side elevation of view of portion of the tree stand of FIG. 1.

As shown by FIGS. 1-3, intermediate plate portion 54 includes a slot 60 which extends through plate portion 54. Slot 60 is located between portion 46 and 48. Slot 60 includes a plurality of longitudinally spaced hooks or notches 62. Notches 62 facilitate retention of various structures at different vertically spaced locations longitudinally along post 24. In the example illustrated, notches 62 receive platform support line 30. Notches 62 facilitate the supporting of foot platform 28 at different angles with respect to post 24. Because notches 62 are formed as part of the intermediate plate portion 54, additional structures for providing such notches 62 may be omitted.

Seat platform 26 comprises a platform mounted to mounting portion 46 that is configured to be sat upon by a person using tree stand 20. In the example illustrated, seat platform 26 comprises a perforate platform pinned or bolted to mounting portion 46 such that platform 26 may be pivoted between a withdrawn position against tree trunk 22 in an orientation substantially parallel to post 24 and an extended position substantially perpendicular to post 24 as shown. Seat platform 26 includes an adjustable set screw on its lower side bearing against post 24 when seat platform 26 is in the extended, in use position. In other embodiments, seat platform 26 may have other configurations or may be omitted.

Foot platform 28 comprises a platform mounted to mounting portion 48 of post 24. Foot platform 28 provides a surface upon which a person may stand or rest his or her feet. In the example illustrated, foot platform 28 comprises a perforate platform having a rear tree abutting portion 70 that bears against tree trunk 22. Portion 70 stabilizes foot platform 28 against tree 22 and offsets post 24 from tree trunk 22 such that post 24 may be substantially vertical and parallel to tree trunk 22. In other embodiments, foot platform 28 may have other configurations and may be connected to and supported by post 24 and tree trunk 22 in other fashions.

Platform support line 30 comprises one or more flexible lines connecting extended portions 72 of foot platform 28 to post 24 to support foot platform 28 in the extended position shown. In the example illustrated, platform support line 30 comprises a pair of lines having ends 74 fastened to extended portion 72 of foot platform 28 and opposite ends 76 fastened to a pin or two-headed bolt 78 removably received within one of notches 62. By selectively positioning bolt 78 within one of notches 62, an orientation angle of foot platform 28 may be adjusted.

Tree claw 32 comprises one or more structures extending from post 24 that are configured to grip tree trunk 22 and offset post 24 from tree trunk 22. In the example illustrated, tree claw 32 comprises an offset bracket. In other embodiments, tree claw 32 may have other configurations.

In the example illustrated, tree claw 32 is integrally formed as a single unitary body with post 24. In the example illustrated, tree claw 32 is integrally cast with post 24. Because tree claw 32 is integral with post 24, tree claw 32 cannot move relative to post 24 even in cold whether where offset brackets merely fastened to post 24 might otherwise shrink and move relative to post 24 as a person upon tree stand 20 moves or shifts his or her weight. As a result, squeaking or other sounds resulting from such relative movements is prevented, allowing tree stand 20 to be quieter. Because tree stand 20 is quieter, wildlife observation is enhanced.

In the example illustrated, platform support line 30 comprises a pair of steel cables. In other embodiments, line 30 may comprise a pair of straps or may comprise a single continuous flexible line. In some embodiments, line 30 may be omitted.

Cinch line posts 34 comprise pins, hooks, protuberances or other male projections extending from post 24 which are configured to be removably fastened to cinch lines 36. Posts 34 are integrally formed as a single unitary body with post 24. In the example illustrated, posts 34 are integrally cast with post 24. Because posts 34 are integral with post 24, posts 34 cannot move relative to post 24 even in cold whether where bolts or other fasteners might otherwise shrink and move relative to post 24 as a person upon tree stand 20 moves or shifts his or her weight. As a result, squeaking or other sounds resulting from such relative movements is prevented, allowing tree stand 20 to be quieter. Because tree stand 20 is quieter, wildlife observation is enhanced.

In the example illustrated, post 24 and the integral features such as claw 32 and posts 34 are cast. In one embodiment, post 24 and the integral features are cast out of one of more metals such as aluminum. In other embodiments, post 24 and the integral features may be formed from other metals, ceramics, plastics and the like and may be formed using methods other than casting. In other embodiments, one or both of claw 32 and posts 34 may alternatively be joined to post 24 in other manners such as using fasteners, interlocking arrangements, welding and the like.

Cinch lines 36 comprised flexible or bendable lines configured to be secured to post 24 by posts 34 and further configured to be wrapped about tree trunk 22 to cinch post 24 to tree trunk 22. In the example illustrated, cinch lines 36 comprise straps which wrap about tree trunk 22 and which have slits receiving post 34 or which are connected to post 34 in other fashions. In other embodiments, cinch lines 36 may comprise cables, flat, spiked or toothed belts or other elongate flexible members having portions configured to be connected to post 34 in other manners.

Figure 5:
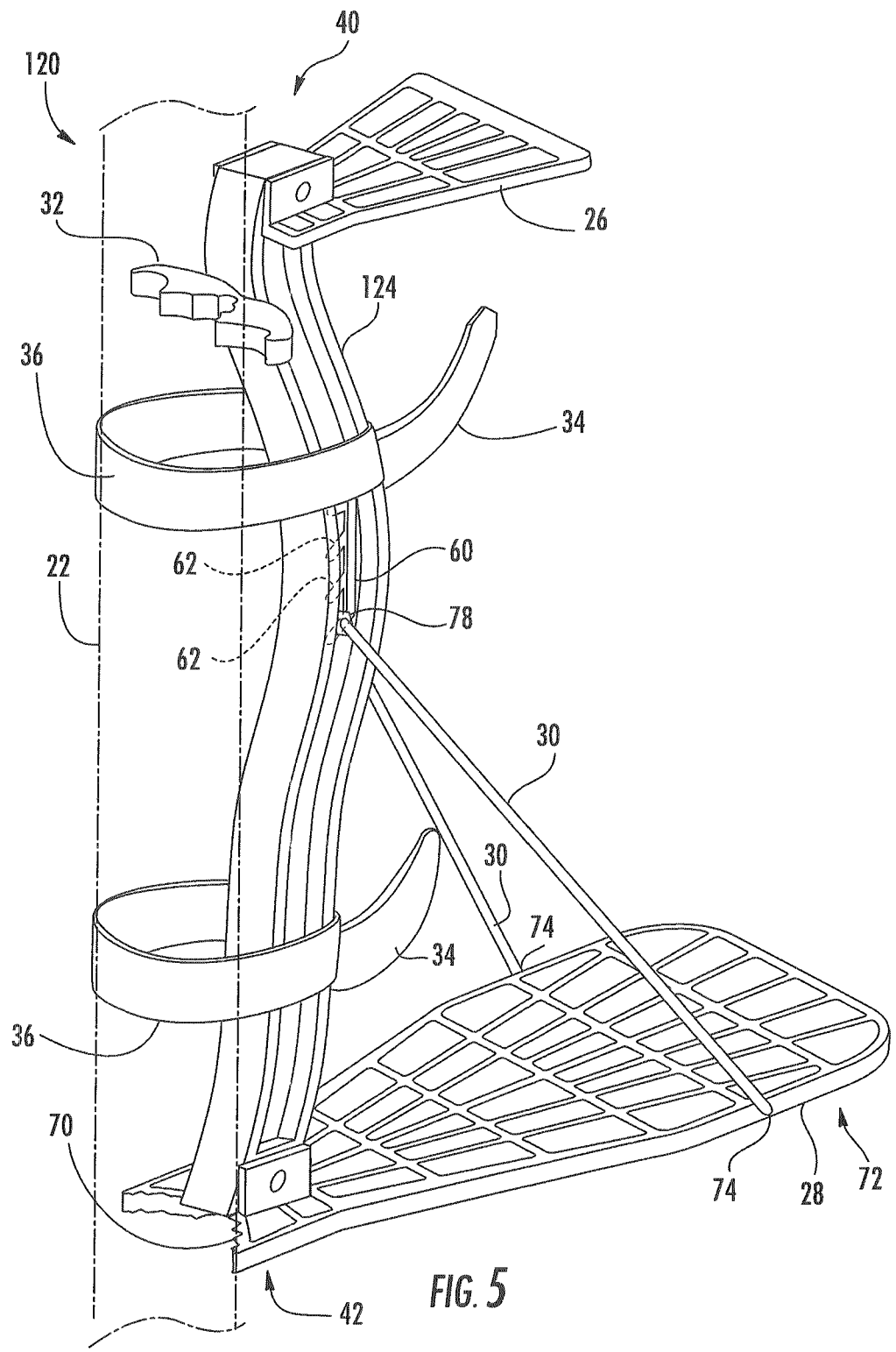
FIG. 5 is a perspective view of another embodiment of the tree stand of FIG. 1 mounted to a tree according to an example embodiment.
Figures 6, 7:
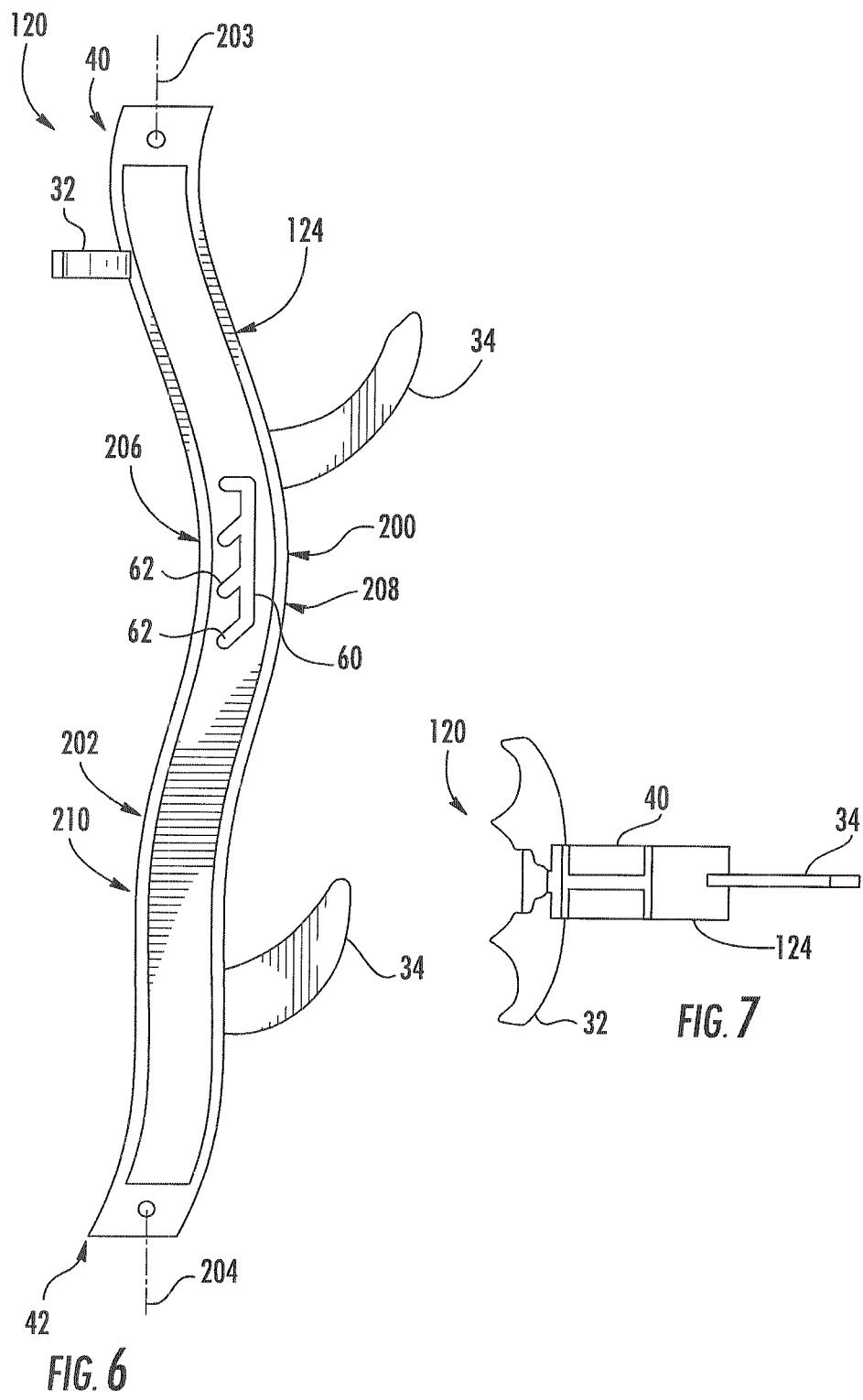
FIG. 6 is a side elevation of view of portions of the tree stand of FIG. 5.
FIG. 7 is a top plan view of the portions of the tree stand of FIG. 6.

FIGS. 5-7 illustrate tree stand 120, another embodiment of tree stand 20. Tree stand 120 is similar to tree stand 20 except that tree stand 120 includes tree stand post 124 instead of post 24. Tree stand post 124 is similar to tree stand post 24 except that post 124 includes multiple bends or curved portions so as to simulate a shape of a vine or tree branch. Those remaining elements of tree stand 120 and those portions of post-124 which correspond to elements of tree stand 20 and post 24 are numbered similarly.

As best shown in FIG. 6, post 124 has a plurality of longitudinally extending bends 200, 202 between ends 40 and 42. Bends 200 and 202 are consecutive and extend oblique with respect to one another and with respect to the general longitudinal axis extending between ends 40 and 42. In the example illustrated, bends 40 and 42 are aligned with one another. In other words, as shown in FIG. 7, longitudinal centerlines 203, 204 of ends 40 and 42 coincide with one another. In other embodiments, such longitudinal centerlines 203, 204 may be offset with respect to one another.

Bend 200 has a concave side facing in a same direction as that of claw 32 are facing in the same direction that claw 32 extends or projects from post 124. Bend 200 has an opposite convex side 208 facing in the same direction as the direction at which posts 34 projects from post 124. Bend 202 bends in a substantially opposite direction. Bend 202 has a convex side 210 facing in the same direction as claw 32 and an opposite concave side facing in the same direction as that of posts 34. The multiple bends or longitudinal curves of post 124 simulates a tree branch or tree trunk, enhancing the inconspicuous nature of tree stand 120 and improving wildlife observation or hunting results.

Although post 124 is illustrated as having a pair of consecutive bends, in other embodiments, post 124 may have a fewer or greater of such bends or longitudinal curves and such curves or bends may be spaced by linear segments. By having two or more curves or bends, post 124 may better simulate a tree trunk or tree branch as compared to a single bend or curve. As with post 24, post 124 has a non-tubular shape to reduce noise generation. As with post 24, post 124 has an I-shaped cross-section. In the example illustrated, post 124 is integral as a single unitary body with claw 32 and posts 34 to further reduce noise generation. In the example illustrated, post 124 and the integral features such as claw 32 and posts 34 are cast. In one embodiment, post 124 and the integral features are cast out of one of more metals such as aluminum. In other embodiments, post 124 and the integral features maybe formed from other metals, ceramics, plastics and the like and may be formed using methods other than casting.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
    a tree stand post;
    a tree claw integral with the post as a single unitary body; and
    at least one cinch line post integral with the post as the single unitary body.

2. The apparatus of claim 1, wherein the post has an "I" cross sectional shape with a first plate portion, a second plate portion parallel to the first plate and an intermediate plate portion interconnecting and extending perpendicular to the first plate portion and the second plate portion, wherein the intermediate plate portion includes a slot forming a plurality of spaced notches.

3. The apparatus of claim 1 further comprising:
   a seat platform connected to a first portion of the post; and
   a foot platform connected to a second portion of the post.

4. The apparatus of claim 1 further comprising a platform connected to and extending from the post.

5. The apparatus of claim 2, wherein the post longitudinally extends from a first end to a second end and wherein the post includes a plurality of longitudinally extending curves between the first end and the second end.

6. The apparatus of claim 1, wherein the tree claw faces in a first direction and wherein the post has a longitudinally extending concave side facing the first direction.

7. The apparatus of claim 1, wherein the post longitudinally extends between a first end and a second end and wherein the post comprises:
   a first longitudinally extending portion;
   a second longitudinally extending portion adjacent and oblique to the first longitudinally extending portion; and
   a third longitudinally extending portion adjacent and oblique to the second longitudinally extending portion.

8. The apparatus of claim 1, wherein the post has a first end and a second end and wherein the post has a non-tubular cross-section from the first end to the second end.

9. The apparatus of claim 8, wherein the post includes a slot extending through the post and forming a plurality of notches.

10. The apparatus of claim 2, wherein the tree claw extends from the first plate portion such that the first plate portion faces a tree when the tree claw is in engagement with the tree and wherein the at least one cinch line post extends from the second plate portion.

11. The apparatus of claim 2, wherein the intermediate plate portion comprises a first portion having a first thickness between the slot and an end of the post and an enlarged portion adjacent the slot, the enlarged portion having a second thickness greater than the first thickness.

\* \* \* \* \*